(12) United States Patent
Hong

(10) Patent No.: US 11,191,085 B2
(45) Date of Patent: Nov. 30, 2021

(54) METHOD AND APPARATUS FOR COORDINATING IN-DEVICE COEXISTENCE INTERFERENCE, USER EQUIPMENT AND COMMUNICATION DEVICE

(71) Applicant: Beijing Xiaomi Mobile Software Co., Ltd., Beijing (CN)

(72) Inventor: Wei Hong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/968,748

(22) PCT Filed: Feb. 11, 2018

(86) PCT No.: PCT/CN2018/076249
§ 371 (c)(1),
(2) Date: Aug. 10, 2020

(87) PCT Pub. No.: WO2019/153296
PCT Pub. Date: Aug. 15, 2019

(65) Prior Publication Data
US 2021/0022146 A1    Jan. 21, 2021

(51) Int. Cl.
*H04W 24/10* (2009.01)
*H04W 72/08* (2009.01)
(Continued)

(52) U.S. Cl.
CPC ......... *H04W 72/082* (2013.01); *H04W 24/10* (2013.01); *H04W 72/048* (2013.01); *H04W 88/06* (2013.01)

(58) Field of Classification Search
CPC .... H04W 88/06; H04W 72/048; H04W 76/27
See application file for complete search history.

(56) References Cited

U.S. PATENT DOCUMENTS

2013/0288742 A1    10/2013 Yao et al.
2013/0324172 A1    12/2013 Ahn et al.
(Continued)

FOREIGN PATENT DOCUMENTS

CN    102595543 A    7/2012
CN    103444100 A    12/2013
(Continued)

OTHER PUBLICATIONS

State Intellectual Property Office of the People's Republic of China, Office Action and Search Report Issued in Application No. 201880000166X, dated Apr. 2, 2020, 28 pages.
(Continued)

*Primary Examiner* — Michael T Vu
(74) *Attorney, Agent, or Firm* — Finnegan, Henderson, Farabow, Garrett & Dunner, L.L.P.

(57) ABSTRACT

The present disclosure relates to a method and apparatus for coordinating IDC interference, user equipment and a communication device. The method of coordinating the IDC interference includes: receiving an IDC interference report reported by user equipment, wherein the IDC interference report carries IDC interference information of the user equipment in the EN-DC scenario, and the IDC interference information includes an interference parameter indicating IDC interference; determining information for coordinating IDC interference based on the IDC interference report; and sending the information for coordinating IDC interference to the user equipment. The technical solutions of the present disclosure enable the user equipment to actively report the IDC interference report when the IDC interference occurs in the EN-DC scenario, and then perform IDC interference coordination based on the information for coordinating IDC interference configured by a base station, thereby improving data transmission performance of the user equipment.

20 Claims, 8 Drawing Sheets

---

Receive an IDC interference report reported by user equipment, where the IDC interference report carries IDC interference information of the user equipment in the EN-DC scenario — 110

↓

Determine information for coordinating IDC interference based on the IDC interference report — 120

↓

Send the information for coordinating IDC interference to the user equipment — 130

(51) Int. Cl.
*H04W 72/04* (2009.01)
*H04W 88/06* (2009.01)

(56) References Cited

U.S. PATENT DOCUMENTS

| | | |
|---|---|---|
| 2014/0092761 A1 | 4/2014 | Behravan et al. |
| 2014/0094125 A1 | 4/2014 | Behravan et al. |
| 2015/0382364 A1 | 12/2015 | Sharma |
| 2016/0021554 A1 | 1/2016 | Behravan et al. |
| 2016/0080964 A1 | 3/2016 | Ahn et al. |
| 2016/0081000 A1* | 3/2016 | Chen .................... H04W 60/04 370/331 |
| 2016/0205581 A1 | 7/2016 | Lee et al. |
| 2017/0026865 A1 | 1/2017 | Behravan et al. |
| 2017/0078908 A1 | 3/2017 | Ahn et al. |
| 2017/0339746 A1* | 11/2017 | Ahn ...................... H04W 16/14 |
| 2018/0206142 A1 | 7/2018 | Ahn et al. |

FOREIGN PATENT DOCUMENTS

| | | |
|---|---|---|
| CN | 104885503 A | 9/2015 |
| CN | 106060866 A | 10/2016 |

OTHER PUBLICATIONS

ISA State Intellectual Property Office of the People's Republic of China, International Search Report Issued in Application No. PCT/CN2018/076249, dated Nov. 14, 2018, WIPO, 6 pages.
3rd Generation Partnership Project, Technical Specification Group Radio Access Network, Evolved Universal Terrestrial Radio Access (E-UTRA), and Evolved Universal Terrestrial Radio Access Network (E-UTRAN), Overall description Stage 2, (Release 14), 3GPP TS 36.300 V14.5.0 (Dec. 2017), 4 pages.
3rd Generation Partnership Project, Technical Specification Group Radio Access Network, Radio Resource Control (RRC), Protocol specification (Release 15), 3GPP TS 36.331 V15.0.1 (Jan. 2018), 9 pages.
3rd Generation Partnership Project, Technical Specification Group Radio Access Network ,Evolved Universal Terrestrial Radio Access (E-UTRA), Study on signalling and procedure for interference avoidance for in-device coexistence (Release 11), 3GPP TR 36.816 V11.2.0 (Dec. 2011), 44 pages.
Extended European Search Report Issued in Application No. 18905622. 9, from the European Patent Office, dated Nov. 27, 2020, 8 pages.
Written Opinion of the International Searching Authority Issued in Application No. PCT/CN2018/076249, dated Nov. 14, 2018, WIPO, 8 pages.

* cited by examiner

METHOD AND APPARATUS FOR COORDINATING IN-DEVICE COEXISTENCE INTERFERENCE, USER EQUIPMENT AND COMMUNICATION DEVICE

CROSS REFERENCE TO RELATED APPLICATIONS

This application is a national phase application based on International Application No. PCT/CN2018/076249, filed Feb. 11, 2018, the content of which is incorporated herein by reference.

TECHNICAL FIELD

The present disclosure relates to the field of communication technologies, and in particular relates to a method and apparatus for coordinating in-device coexistence interference, user equipment and a communication device.

BACKGROUND

To commercialize the $5^{th}$ Generation (5G) mobile communication technology more quickly, the $3^{rd}$ Generation Partnership Project (3GPP) has approved a Non-StandAlone (NSA) scenario to be preferentially standardized. The NSA scenario refers to a dual connectivity scenario of an evolved universal radio access network and a next generation network, such as an EUTRAN-NR (Evolved Universal Terrestrial Radio Access Network-New Radio) Dual Connectivity (EN-DC) scenario, which is implemented by using a Long Term Evolution (LTE) base station as a master base station and a 5G base station as a secondary base station. In the EN-DC scenario, user equipment (UE) needs to maintain two communication links at the same time, including an LTE communication link and an NR communication link.

Since more than two kinds of wireless technologies such as LTE, a 5G, a Wireless Local Area Network (WLAN) and Bluetooth (BT) are supported simultaneously in a device, a transmission operation of a wireless system will interfere with a reception operation of another wireless system, that is, an In-Device Coexistence (IDC) interference problem appears. In the related art, an NR system does not provide a solution to the IDC interference problem. To promote and standardize the EN-DC scenario, there is a need to propose a technical solution to coordinate the IDC interference in the EN-DC scenario.

SUMMARY

In order to overcome the problem existing in the related art, examples of the present disclosure provide a method and apparatus for coordinating IDC interference, user equipment and a communication device. The user equipment reports IDC interference coordination capability in the EN-DC scenario, such that the base station, based on the IDC interference coordination capability of the user equipment in the EN-DC scenario, configures, for the user equipment, a manner of solving the IDC interference problem in the EN-DC scenario, thereby, improving data transmission performance of the user equipment.

According to a first aspect of the examples of the present disclosure, there is provided a method of coordinating IDC interference. The method is applied to an LTE base station in an EN-DC scenario, and includes:

receiving an IDC interference report reported by user equipment, where the IDC interference report carries IDC interference information of the user equipment in the EN-DC scenario, and the IDC interference information includes an interference parameter indicating IDC interference;

determining information for coordinating IDC interference based on the IDC interference report; and sending the information for coordinating IDC interference to the user equipment.

In an example, the method further includes:

receiving information of IDC interference coordination capability reported by the user equipment through first RRC signaling, where the information of IDC interference coordination capability indicates whether the user equipment is capable of supporting IDC interference coordination in the EN-DC scenario; and configuring, based on the information of IDC interference coordination capability and for the user equipment, capability of the user equipment to process IDC interference occurring in the EN-DC scenario by using second RRC signaling, where the capability to process IDC interference includes capability of the user equipment to report the IDC interference report, or capability of the user equipment to report the IDC interference report and capability of the user equipment to deny autonomously, where the capability to deny autonomously indicates a number of uplink transmission units that the user equipment is allowed to autonomously deny within a set time period.

In an example, the IDC interference information of the user equipment in the EN-DC scenario includes at least one of the following information: an interfered frequency band, an interfered cell, an interfered system type or an interference direction; and the IDC interference report further includes recommended coordination information for coordinating IDC interference.

In an example, determining the information for coordinating IDC interference based on the IDC interference information includes:

in response to that the IDC interference report includes recommended coordination information for coordinating IDC interference, determining the information for coordinating IDC interference based on the recommended coordination information for coordinating IDC interference; and in response to that the IDC interference report does not comprise the recommended coordination information for coordinating IDC interference, determining the information for coordinating IDC interference based on the IDC interference information.

In an example, configuring, for the user equipment, the capability of the user equipment to process IDC interference occurring in the EN-DC scenario by using the second RRC signaling includes:

obtaining the second RRC signaling by adding a first information element to original RRC connection reconfiguration signaling and adding a first indicating bit to the first information element, where the first indicating bit indicates the capability of the user equipment to process IDC interference occurring in the EN-DC scenario; and sending the second RRC signaling to the user equipment.

In an example, configuring, for the user equipment, the capability of the user equipment to process IDC interference occurring in the EN-DC scenario by using the second RRC signaling includes:

obtaining the second RRC signaling by adding a second indicating bit to original IDC configuration signaling, where the second indicating bit indicates the capability of the user equipment to process IDC interference occurring in the EN-DC scenario; and sending the second RRC signaling to the user equipment.

According to a second aspect of the examples of the present disclosure, there is provided a method of coordinating IDC interference. The method is applied to user equipment in an EN-DC scenario, and includes:

in response to that IDC interference occurs in a system including at least one of an LTE system or an NR system, sending an IDC interference report to an LTE base station, where the IDC interference report carries IDC interference information of the user equipment in the EN-DC scenario, and the IDC interference information includes an interference parameter indicating the IDC interference;

receiving information for coordinating IDC interference sent by the LTE base station in response to the IDC interference report; and performing IDC interference coordination processing based on the information for coordinating IDC interference.

In an example, sending the IDC interference report to the LTE base station includes:

obtaining third RRC signaling by adding a second information element to original IDC indication signaling, where the second information element includes the IDC interference report; and sending the third RRC signaling to the LTE base station.

In an example, the method further includes:

obtaining first RRC signaling by adding a third information element to original network capability signaling supported by the user equipment and adding a third indicating bit to the third information element, where the third indicating bit indicates whether the user equipment is capable of supporting IDC interference coordination in the EN-DC scenario;

sending the first RRC signaling to the LTE base station; and receiving second RRC signaling sent by the LTE base station in response to the first RRC signaling, where the second RRC signaling is to configure, for the user equipment, capability of the user equipment to process IDC interference occurring in the EN-DC scenario, and the capability to process includes capability of the user equipment to report the IDC interference report, or capability of the user equipment to report the IDC interference report and capability of the user equipment to deny autonomously, where the capability to deny autonomously indicates a number of uplink transmission units that the user equipment is allowed to autonomously deny within a set time period.

In an example, the method further includes:

in response to that the capability to process IDC interference indicates that the user equipment is currently capable of performing autonomous denial and an interference direction satisfies a condition, for the IDC interference occurring in the system including at least one of the LTE system or the NR system, performing the IDC interference coordination processing in the autonomous denial.

According to a third aspect of the examples of the present disclosure, there is provided an apparatus for coordinating IDC interference. The apparatus is applied to an LTE base station in an EN-DC scenario, and includes:

a first receiving module configured to receive an IDC interference report reported by user equipment, where the IDC interference report carries IDC interference information of the user equipment in the EN-DC scenario, and the IDC interference information includes an interference parameter indicating IDC interference;

a first determining module configured to determine information for coordinating IDC interference based on the IDC interference report; and a first sending module configured to send the information for coordinating IDC interference to the user equipment.

In an example, the apparatus further includes:

a second receiving module configured to receive information of IDC interference coordination capability reported by the user equipment through first RRC signaling, where the information of IDC interference coordination capability indicates whether the user equipment is capable of supporting IDC interference coordination in the EN-DC scenario; and a configuring module configured to configure, based on the information of IDC interference coordination capability and for the user equipment, capability of the user equipment to process IDC interference occurring in the EN-DC scenario by using second RRC signaling, where the capability to process IDC interference includes capability of the user equipment to report the IDC interference report, or capability of the user equipment to report the IDC interference report and capability of the user equipment to deny autonomously, where the capability to deny autonomously indicates a number of uplink transmission units that the user equipment is allowed to autonomously deny within a set time period.

In an example, the IDC interference information of the user equipment in the EN-DC scenario includes at least one of the following information: an interfered frequency band, an interfered cell, an interfered system type or an interference direction; and the IDC interference report further includes recommended coordination information for coordinating IDC interference.

In an example, the first determining module includes:

a first determining submodule configured to, in response to that the IDC interference report includes recommended coordination information for coordinating IDC interference, determine the information for coordinating IDC interference based on the recommended coordination information for coordinating IDC interference; and a second determining submodule configured to, in response to that the IDC interference report does not comprise the recommended coordination information for coordinating IDC interference, determine the information for coordinating IDC interference based on the IDC interference information.

In an example, the configuring module includes:

a first adding submodule configured to obtain the second RRC signaling by adding a first information element to original RRC connection reconfiguration signaling and adding a first indicating bit to the first information element, where the first indicating bit indicates the capability of the user equipment to process IDC interference occurring in the EN-DC scenario; and a first sending submodule configured to send the second RRC signaling to the user equipment.

In an example, the configuring module includes:

a second adding submodule configured to obtain the second RRC signaling by adding a second indicating bit to original IDC configuration signaling, where the second indicating bit indicates the capability of the user equipment to process IDC interference occurring in the EN-DC scenario; and a second sending submodule configured to send the second RRC signaling to the user equipment.

According to a fourth aspect of the examples of the present disclosure, there is provided an apparatus for coordinating IDC interference. The apparatus is applied to user equipment in an EN-DC scenario, and includes:

a second sending module configured to, in response to that IDC interference occurs in a system including at least one of an LTE system or an NR system, send an IDC interference report to an LTE base station, where the IDC interference report carries IDC interference information of the user equipment in the EN-DC scenario, and the IDC interference information includes an interference parameter indicating the IDC interference;

a third receiving module configured to receive information for coordinating IDC interference sent by the LTE base station in response to the IDC interference report; and a coordinating module configured to perform IDC interference coordination processing based on the information for coordinating IDC interference.

In an example, the second sending module includes:

a third adding submodule configured to obtain third RRC signaling by adding a second information element to original IDC indication signaling, where the second information element includes the IDC interference report; and a third sending submodule configured to send the third RRC signaling to the LTE base station.

In an example, the apparatus further includes:

an adding module configured to obtain first RRC signaling by adding a third information element to original network capability signaling supported by the user equipment and adding a third indicating bit to the third information element, where the third indicating bit indicates whether the user equipment is capable of supporting IDC interference coordination in the EN-DC scenario;

a third sending module configured to send the first RRC signaling to the LTE base station; and a fourth receiving module configured to receive second RRC signaling sent by the LTE base station in response to the first RRC signaling, where the second RRC signaling is to configure, for the user equipment, capability of the user equipment to process IDC interference occurring in the EN-DC scenario, and the capability to process IDC interference includes capability of the user equipment to report the IDC interference report, or capability of the user equipment to report the IDC interference report and capability of the user equipment to deny autonomously, where the capability to deny autonomously indicates a number of uplink transmission units that the user equipment is allowed to autonomously deny within a set time period.

In an example, the coordinating module is further configured to:

in response to that the capability to process IDC interference indicates that the user equipment is currently capable of performing autonomous denial and an interference direction satisfies a condition, for the IDC interference occurring in the system including at least one of the LTE system or the NR system, perform the IDC interference coordination processing in the autonomous denial.

According to a fifth aspect of the examples of the present disclosure, there is provided a communication device, including:

a processor; and a memory for storing instructions executable by the processor, where the executable instructions are executed by the processor to implement a method of coordinating IDC interference according to the first aspect.

According to a sixth aspect of the examples of the present disclosure, there is provided user equipment, including:

a processor; and a memory for storing instructions executable by the processor, where the executable instructions are executed by the processor to implement a method of coordinating IDC interference according to the second aspect.

According to a seventh aspect of the examples of the present disclosure, there is provided a non-transitory computer readable storage medium having computer instructions stored thereon, where the instructions are executed by a processor to implement a method of coordinating IDC interference according to the first aspect.

According to an eighth aspect of the examples of the present disclosure, there is provided a non-transitory computer readable storage medium having computer instructions stored thereon, where the instructions are executed by a processor to implement a method of coordinating IDC interference according to the second aspect.

The technical solutions provided according to examples of the present disclosure may realize the following beneficial effects.

The user equipment can actively report the IDC interference report when the IDC interference occurs in the EN-DC scenario, and further perform IDC interference coordination based on the information for coordinating IDC interference configured by the base station, thereby improving data transmission performance of the user equipment.

It should be understood that the above general description and the following detailed description are only exemplary and explanatory and are not restrictive of the present disclosure.

BRIEF DESCRIPTION OF THE DRAWINGS

The accompanying drawings, which are incorporated in and constituted a part of this specification, illustrate examples consistent with the present disclosure and, together with the description, serve to explain the principles of the disclosure.

DETAILED DESCRIPTION OF THE EMBODIMENTS

Figure 1A:
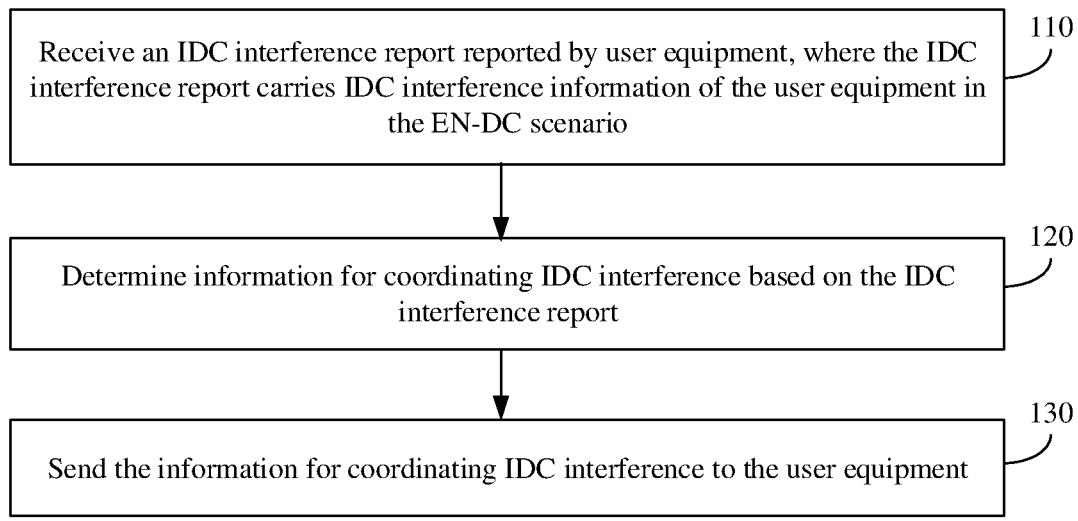
FIG. 1A is a flowchart illustrating a method of coordinating IDC interference according to an example.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

In the technical solutions provided according to the present disclosure, since a plurality of communication systems such as an LTE system, an NR system, a WLAN system and a BT system exist simultaneously in user equipment, when communication frequency bands of different wireless communication systems are adjacent, a transmission operation of a system may interfere with a reception operation of another system, causing an IDC interference problem. IDC interference coordination may have a variety of ways such as Frequency Division Multiplexing (FDM), Time Division Multiplexing (TDM) and autonomous denial. The FDM refers to that interfering wireless systems are adjusted to work in frequency bands where they do not interfere with each other. For example, if the NR system and the WLAN system interfere with each other, the NR system and the WLAN system may be adjusted to work in frequency bands respectively where they do not interfere with each other. The TDM refers to that interfering wireless systems work in interfering frequency bands in a time-division manner where only one wireless system transmits and receives data within one time period. The autonomous denial refers to that when uplink data transmission of the LTE system and/or the NR system interferes with another wireless system, user equipment automatically cancels the uplink data transmission of the LTE system and/or the NR system.

Figure 1B:
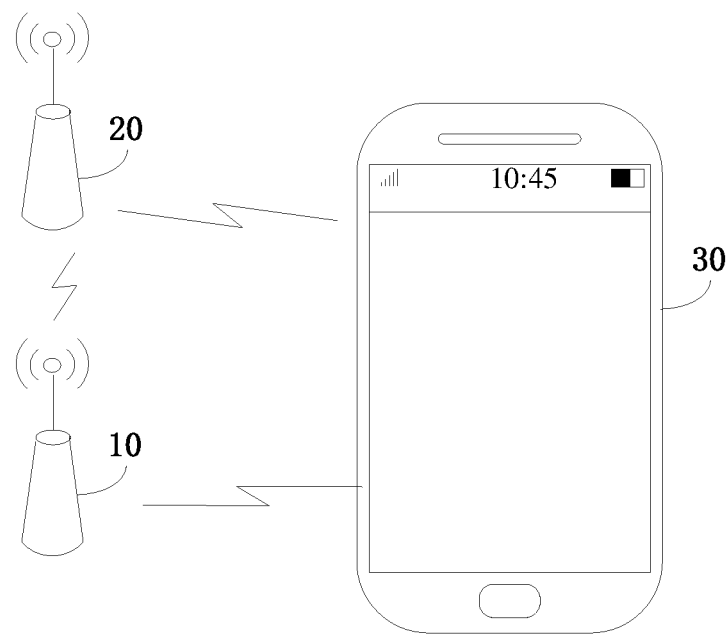
FIG. 1B is an application scenario diagram illustrating a method of coordinating IDC interference according to an example.

FIG. 1A is a flowchart illustrating a method of coordinating IDC interference according to an example. FIG. 1B is an application scenario diagram illustrating a method of coordinating IDC interference according to an example. The method of coordinating the IDC interference may be applied to an LTE base station in an EN-DC scenario. As shown in FIG. 1A, the method of coordinating the IDC interference includes the following steps 110-130.

At step 110, an IDC interference report reported by user equipment is received, where the IDC interference report carries IDC interference information of user equipment in the EN-DC scenario.

In an example, a base station configures that user equipment can report an IDC problem after the user equipment has IDC interference in an EN-DC scenario. The user equipment may send an IDC interference report to the base station when the IDC interference occurs. The IDC interference report may carry the IDC interference information of the user equipment in the EN-DC scenario. The IDC interference information includes an interference parameter indicating the IDC interference. The IDC interference information includes, but is not limited to, any one or more of the following information: an interfered frequency band, an interfered cell, an interfered system type, and an interference direction.

In an example, the interfered system type refers to a wireless system that interferes with an LTE system and/or an NR system. For example, an interference problem that occurs between the NR system and a WLAN system is reported. In an example, the interfered frequency band refers to a frequency band where IDC interference occurs. For example, interference that occurs in a 5725-5850 MHz frequency band is reported. The interfered cell refers to a cell where IDC interference occurs. For example, interference occurs in cell 1. In an example, the interference direction refers to whether the LTE system and/or the NR system is an interfered party or an interferer. For example, the NR system that is interfered by a BT system is reported.

In an example, the IDC interference report may also indicate recommended coordination information for coordinating IDC interference. For example, the IDC interference report indicates that the base station and the user equipment may coordinate interference in a TDM pattern.

At step 120, information for coordinating IDC interference is determined based on the IDC interference report.

In an example, when the IDC interference report does not include the recommended coordination information for coordinating IDC interference, the base station may determine the information for coordinating IDC interference based on the IDC interference information carried in the IDC interference report. For example, it is instructed that the user equipment transmits uplink data of wireless system 1 in subframe 1 and transmits uplink data of wireless system 2 in subframe 2, or it is instructed that the user equipment performs data transmission of wireless system 1 in frequency band 1 and performs data transmission of wireless system 2 in frequency band 2.

In an example, when the IDC interference report includes the recommended coordination information for coordinating IDC interference, the base station may determine the information for coordinating IDC interference with reference to a recommended manner of solving the IDC interference. For example, if the user equipment recommends using the TDM pattern to coordinate the interference, the base station may determine to coordinate the interference in a TDM manner, and further determine to transmit uplink data of wireless system 1 in subframe 1 and transmit uplink data of wireless system 2 in subframe 2.

At step 130, the information for coordinating IDC interference is sent to the user equipment.

In an exemplary scenario, as shown in FIG. 1B, LTE base station 10 which is a master base station, 5G base station 20 which is a secondary base station, and user equipment 30 are deployed in an EN-DC scenario. In addition to an LTE system and an NR system, user equipment 30 may further support other communication systems, such as a WLAN system, a BT system, and so on. When the LTE system and/or the NR system of user equipment 30 interferes with other systems, an interference report may be sent to the master base station, e.g., LTE base station 10, and then the master base station, e.g., LTE base station 10, configures, for user equipment 30, the information for coordinating IDC interference, improving data transmission performance of user equipment 30.

In this example, through the above steps 110-130, the user equipment can actively report the IDC interference report when the IDC interference occurs in the EN-DC scenario, and further perform IDC interference coordination based on the information for coordinating IDC interference configured by the base station, thereby improving data transmission performance of the user equipment.

The technical solutions provided according to examples of the present disclosure are described below with specific examples.

Figure 2:
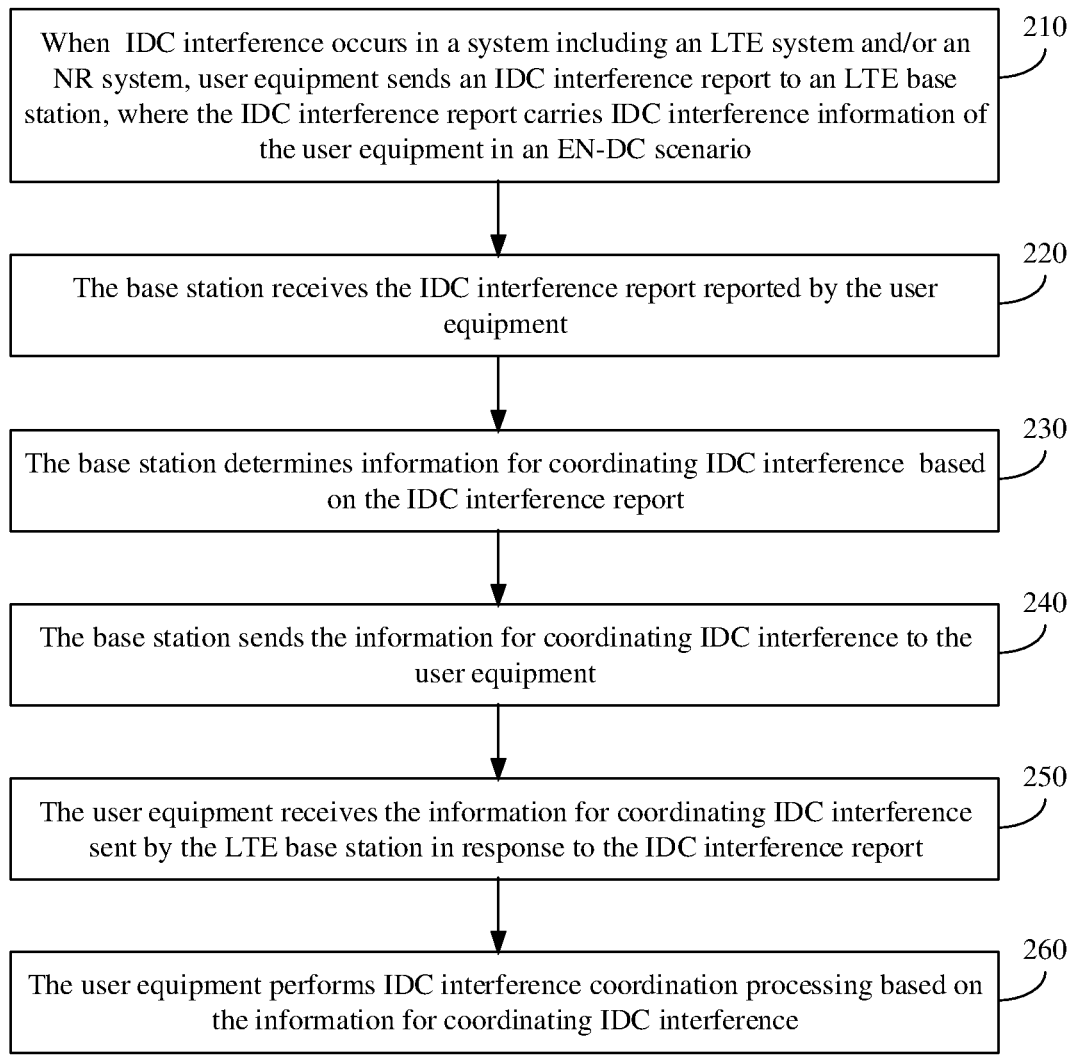
FIG. 2 is flowchart 1 illustrating interaction between entities in a method of coordinating IDC interference according to an example.

FIG. 2 is flowchart 1 illustrating interaction between entities in a method of coordinating IDC interference according to an example. For the above method provided according to examples of the present disclosure, interaction between a base station and user equipment to implement IDC interference coordination is described as an example for illustration. As shown in FIG. 2, the following steps are included.

At step 210, when IDC interference occurs in a system including an LTE system and/or an NR system, the user equipment sends an IDC interference report to an LTE base station. The IDC interference report carries IDC interference information of the user equipment in an EN-DC scenario.

In an example, the IDC interference may occur in any two or three wireless systems in a device. When an interference system is an LTE system or an NR system, the user equipment may send the IDC interference report to the LTE base station.

In an example, the IDC interference report may carry the IDC interference information of the user equipment in the EN-DC scenario. Or the IDC interference report may carry the IDC interference information and recommended coordination information for coordinating IDC interference.

In an example, the user equipment may send the IDC interference report through Radio Resource Control (RRC) signaling. Specifically, a second information element, for example, an InDeviceCoexIndication-v15 information element, is added to original IDC indication InDeviceCoexIndication signaling of the LTE system, and the IDC interference report is indicated in the InDeviceCoexIndication-v15 information element.

At step 220, the base station receives the IDC interference report from the user equipment.

At step 230, the base station determines information for coordinating IDC interference based on the IDC interference report.

At step 240, the base station sends the information for coordinating IDC interference to the user equipment.

In an example, for description of steps 220-240, reference may be made to the description of steps 110-130 in the example shown in FIG. 1A, which will not be described in detail here.

At step 250, the user equipment receives the information for coordinating IDC interference from the LTE base station based on the IDC interference report.

At step 260, the user equipment performs IDC interference coordination processing based on the information for coordinating IDC interference.

In an example, the user equipment may perform data transmission based on the information for coordinating IDC interference configured by the base station, so as to solve IDC interference. For example, if the information for coordinating IDC interference instructs that the user equipment transmits uplink data of wireless system 1 in subframe 1 and transmits uplink data of wireless system 2 in subframe 2, the user equipment may, according to the instruction, transmit the uplink data of wireless system 1 in subframe 1, and transmit the uplink data of wireless system 2 in subframe 2. Or, if the information for coordinating IDC interference instructs that the user equipment performs data transmission of wireless system 1 in frequency band 1 and data transmission of wireless system 2 in frequency band 2, the user equipment may perform the data transmission of wireless system 1 in frequency band 1 and the data transmission of wireless system 2 in frequency band 2, thereby solving the IDC interference.

In an example, when IDC interference occurs, in addition to reporting an IDC interference report, the user equipment may further deny to send uplink data in an LTE system and/or an NR system where interference occurs in a manner of autonomous denial, and/or deny to send uplink data on a time-frequency resource where the IDC interference occurs in a manner of autonomous denial.

In this example, when the IDC interference occurs in the EN-DC scenario, by reporting the IDC interference report, the user equipment may perform the IDC interference coordination processing based on the information for coordinating IDC interference configured by the base station. The user equipment may also perform the IDC interference coordination processing in a manner of autonomous denial, thereby improving data transmission efficiency of the user equipment.

Figure 3:
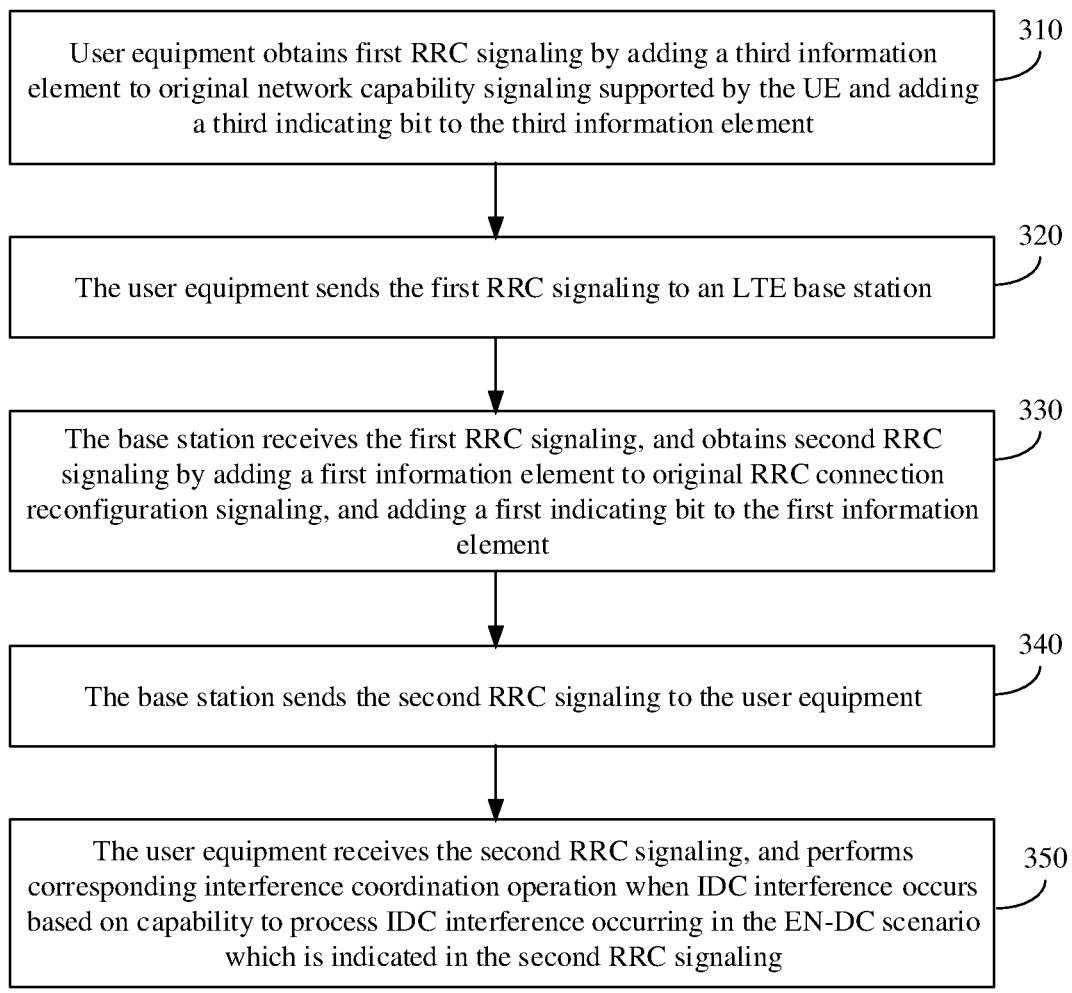
FIG. 3 is flowchart 2 illustrating interaction between entities in a method of coordinating IDC interference according to an example.

FIG. 3 is flowchart 2 illustrating interaction between entities in a method of coordinating IDC interference according to an example. For the above method provided according to examples of the present disclosure, interaction between a base station and user equipment for enabling the user equipment to support IDC interference coordination in an EN-DC scenario is described as an example for illustration. As shown in FIG. 3, the following steps are included.

At step 310, the user equipment obtains first RRC signaling by adding a third information element to original network capability signaling supported by the user equipment, where a third indicating bit is added to the third information element.

In an example, the third indicating bit indicates whether the user equipment is capable of supporting IDC interference coordination in the EN-DC scenario, that is, whether the user equipment has the capability to report an IDC problem in the EN-DC scenario.

In an example, when 5G user equipment supports the capability to report the IDC problem in the EN-DC scenario, a third information element, for example, an Other-Parameters-v15 information element, may be added to network capability signaling, e.g., UE-EUTRA-Capability signaling, supported by the user equipment in the RRC signaling. A third indicating bit, for example, an inDeviceCoexInd-endc indicating bit, is added to the Other-Parameters-v15 information element. The third indicating bit indicates whether the user equipment is capable of supporting IDC interference coordination in the EN-DC scenario.

At step 320, the user equipment sends the first RRC signaling to an LTE base station.

At step 330, the base station receives the first RRC signaling, and obtains second RRC signaling by adding a first information element to original RRC connection reconfiguration signaling and adding a first indicating bit to the first information element.

In an example, the first indicating bit indicates capability of the user equipment to process IDC interference occurring in the EN-DC scenario. The capability to process IDC interference may indicate capability of whether the user equipment can send an IDC interference report to the base station when the IDC interference occurs in the EN-DC scenario, and may further indicate capability of whether the user equipment can coordinate the IDC interference in a manner of autonomous denial when the IDC interference occurs in the EN-DC scenario.

In an example, when configuring that the user equipment can deny autonomously, the base station may further configure the number of uplink transmission units that the user equipment is allowed to autonomously deny within a set time period.

In an example, the base station may add a first information element, for example, an OtherConfig-r15 information element, to the original RRC connection reconfiguration signaling, e.g., RRCConnectionReconfiguration signaling, and add a first indicating bit, for example, an IDC-Config-r15 indicating bit, to the first information element, thereby indicating the capability of the user equipment to process IDC interference occurring in the EN-DC scenario.

At step 340, the base station sends the second RRC signaling to the user equipment.

At step 350, the user equipment receives the second RRC signaling, and performs corresponding interference coordination operation when the IDC interference occurs based on the capability to process IDC interference occurring in the EN-DC scenario which is indicated in the second RRC signaling.

In an example, the interference coordination operation may be to solve the IDC problem in the EN-DC scenario by reporting the IDC interference report, or in a manner of autonomous denial.

In this example, the user equipment may report the IDC interference coordination capability in the EN-DC scenario, such that the base station, based on the IDC interference coordination capability of the user equipment in the EN-DC scenario, configures, for the user equipment, a manner of solving the IDC interference problem in the EN-DC scenario, thereby, improving data transmission performance of the user equipment.

Figure 4:
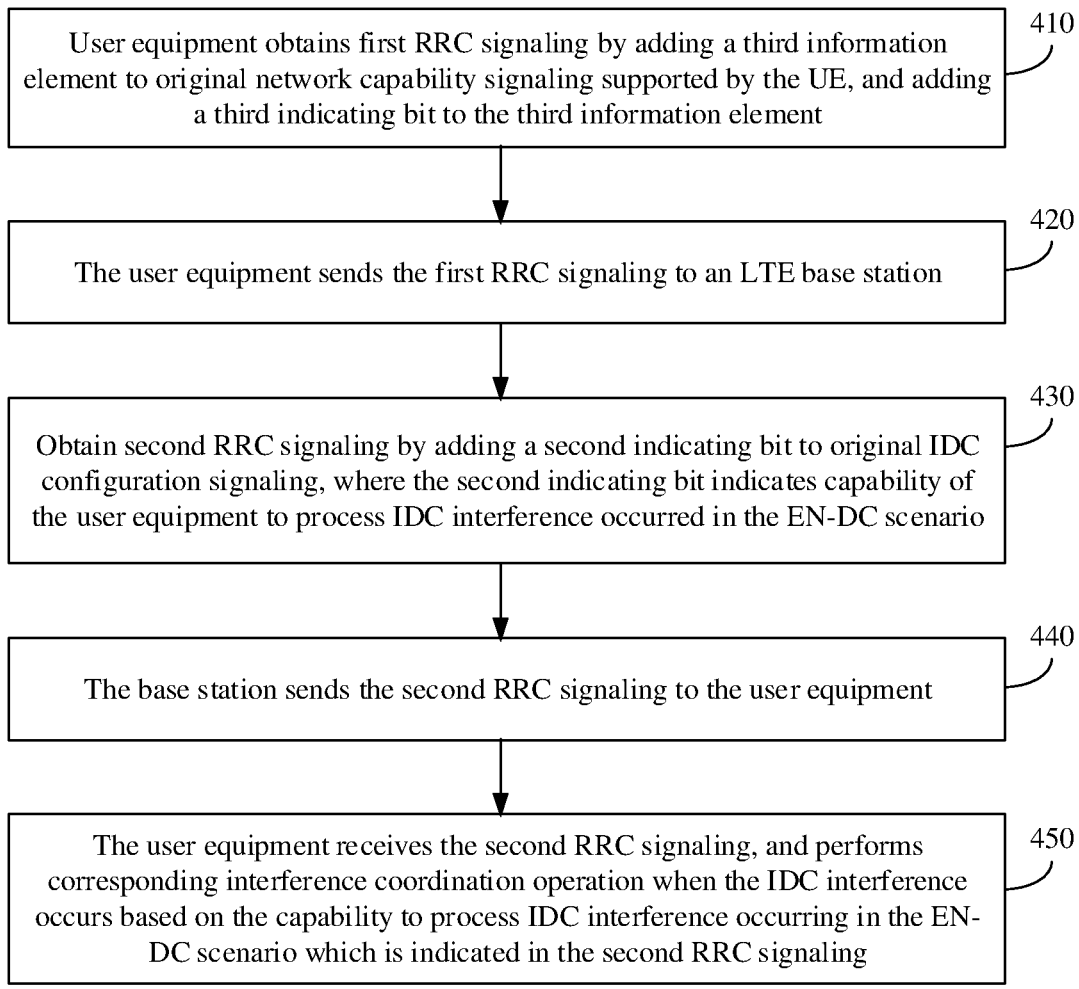
FIG. 4 is flowchart 3 illustrating interaction between entities in a method of coordinating IDC interference according to an example.

FIG. 4 is flowchart 3 illustrating interaction between entities in a method of coordinating IDC interference according to an example. For the above method provided according to examples of the present disclosure, interaction between a base station and user equipment for enabling the user equipment to support IDC interference coordination in an EN-DC scenario is described as an example for illustration. As shown in FIG. 4, the following steps are included:

At step 410, first RRC signaling is obtained by adding a third information element to original network capability signaling supported by the user equipment and adding a third indicating bit to the third information element.

In an example, the third indicating bit indicates whether the user equipment is capable of supporting IDC interference coordination in the EN-DC scenario.

At step 420, the first RRC signaling is sent to an LTE base station.

In an example, for description of steps 410-420, reference may be made to the description of steps 310-320 in the example shown in FIG. 3, which will not be described in detail here.

At step 430, second RRC signaling is obtained by adding a second indicating bit to original IDC configuration signaling. The second indicating bit indicates capability of the user equipment to process IDC interference occurring in the EN-DC scenario.

In an example, the second indicating bit indicates the capability of the user equipment to process IDC interference occurring in the EN-DC scenario. The capability to process IDC interference may indicate capability of whether the user equipment can send an IDC interference report to the base station when the IDC interference occurs in the EN-DC scenario, and may further indicate capability of whether the user equipment can coordinate the IDC interference in a manner of autonomous denial when the IDC interference occurs in the EN-DC scenario.

In an example, when configuring the user equipment to be capable of performing autonomous denial, the base station may further configure the number of uplink transmission units that the user equipment is allowed to autonomously deny within a set time period.

In an example, a second indicating bit, such as IDC-Indication-r15, may be added to the original IDC configuration signaling, e.g., IDC-Config-r11 signaling, in original RRC Connection Reconfiguration signaling, e.g., RRCConnectionReconfiguration signaling, thereby indicating the capability of the user equipment to process IDC interference occurring in the EN-DC scenario.

At step 440, the base station sends the second RRC signaling to the user equipment.

At step 450, the user equipment receives the second RRC signaling, and performs corresponding interference coordination operation when the IDC interference occurs based on the capability to process IDC interference occurring in the EN-DC scenario which is indicated in the second RRC signaling.

In an example, the interference coordination operation may be to solve the IDC problem in the EN-DC scenario by reporting the IDC interference report, or in a manner of autonomous denial.

In this example, the user equipment may report the IDC interference coordination capability in the EN-DC scenario, such that the base station, based on the IDC interference coordination capability of the user equipment in the EN-DC scenario, configures, for the user equipment, a manner of solving the IDC interference problem in the EN-DC scenario, thereby, improving data transmission performance of the user equipment.

Figure 5:
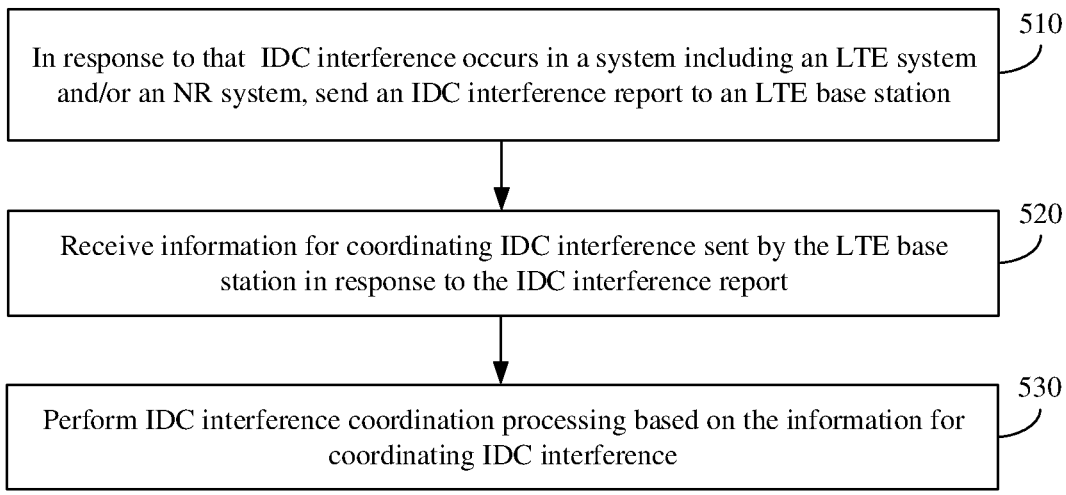
FIG. 5 is a flowchart illustrating a method of coordinating IDC interference according to an example.

FIG. 5 is a flowchart illustrating a method of coordinating IDC interference according to an example. The method of coordinating the IDC interference may be applied to user equipment in an EN-DC scenario. As shown in FIG. 5, the method of coordinating the IDC interference includes the following steps 510-530.

At step 510, in response to that IDC interference occurs in a system including an LTE system and/or an NR system, an IDC interference report is sent to an LTE base station.

In an example, the IDC interference report carries IDC interference information of the user equipment in the EN-DC scenario. The IDC interference information includes an interference parameter indicating the IDC interference, such as an interfered frequency band, an interfered cell, an interfered system type and an interference direction.

At step 520, information for coordinating IDC interference sent by the LTE base station in response to the IDC interference report is received.

At step 530, IDC interference coordination processing is performed based on the information for coordinating IDC interference.

In an example, for description of steps 510-530, reference may be made to the description of corresponding steps in the example shown in FIG. 2, which will not be described in detail here.

In an example, when IDC interference occurs, in addition to reporting an IDC interference report, the user equipment may further deny to send uplink data in an LTE system and/or an NR system where interference occurs in a manner of autonomous denial, and/or deny to send uplink data on a time-frequency resource where the IDC interference occurs in a manner of autonomous denial.

In this example, when the IDC interference occurs in the EN-DC scenario, by reporting the IDC interference report, the user equipment may perform the IDC interference coordination processing based on the information for coordinating IDC interference configured by the base station. The user equipment may also perform the IDC interference coordination processing in a manner of autonomous denial, thereby improving data transmission efficiency of the user equipment.

Figure 6:
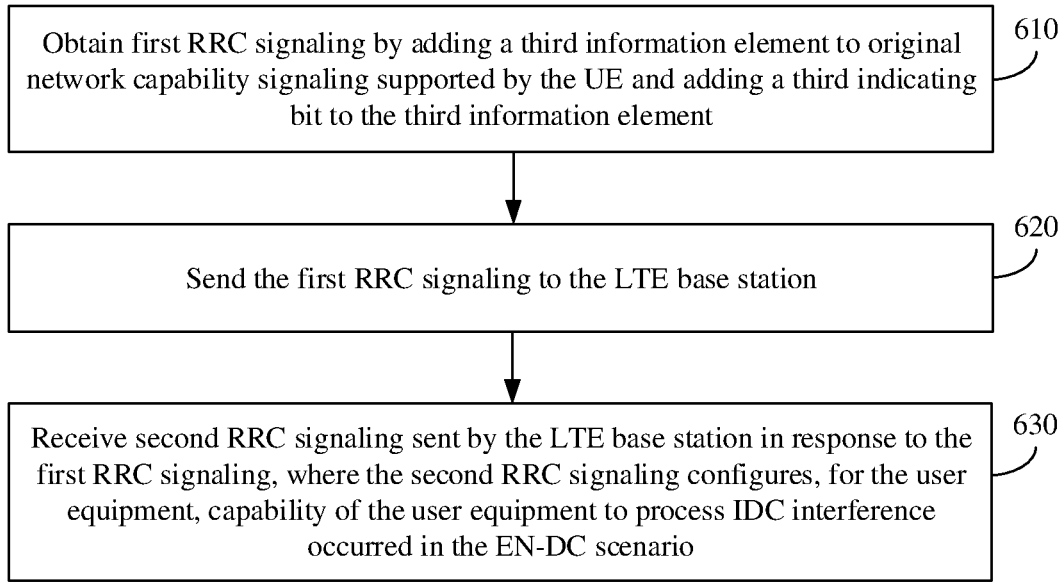
FIG. 6 is a flowchart illustrating another method of coordinating IDC interference according to an example.

FIG. 6 is a flowchart illustrating another method of coordinating IDC interference according to an example. For the above method provided according to examples of the present disclosure, user equipment capable of reporting its own IDC interference coordination is described as an example for illustration. As shown in FIG. 6, the following steps are included.

At step 610, first RRC signaling is obtained by adding a third information element to original network capability signaling supported by the user equipment and adding a third indicating bit to the third information element.

In an example, the third indicating bit indicates whether the user equipment is capable of supporting IDC interference coordination in an EN-DC scenario.

At step 620, the first RRC signaling is sent to an LTE base station.

At step 630, second RRC signaling sent by the LTE base station in response to the first RRC signaling is received. The second RRC signaling configures, for the user equipment, capability of the user equipment to process IDC interference occurring in the EN-DC scenario.

In an example, the capability to process IDC interference includes capability of the user equipment to report an IDC interference report, or capability of the user equipment to report an IDC interference report and capability of the user equipment to deny autonomously, where the capability to deny autonomously indicates the number of uplink transmission units that the user equipment is allowed to autonomously deny within a set time period. For example, if the base station configures the number of uplink subframes that the user equipment can autonomously deny within set time period t to be 5 subframes, the user equipment may autonomously deny data transmission on transmission units with no more than 5 subframes when the IDC interference occurs within set time period t.

In an example, for description of steps 610-630, reference may be made to the description of corresponding steps in the example shown in FIG. 3, which will not be described in detail here.

In this example, the user equipment may report the IDC interference coordination capability in the EN-DC scenario, such that the base station, based on the IDC interference coordination capability of the user equipment in the EN-DC scenario, configures, for the user equipment, a manner of solving the IDC interference problem in the EN-DC scenario, thereby, improving data transmission performance of the user equipment.

Figure 7:
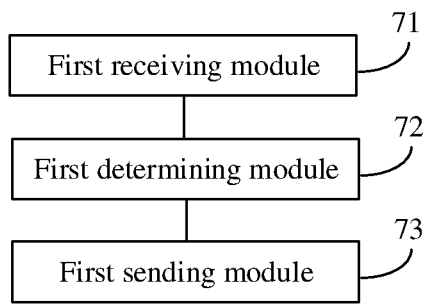
FIG. 7 is a block diagram illustrating an apparatus for coordinating IDC interference according to an example.

FIG. 7 is a block diagram illustrating an apparatus for coordinating IDC interference according to an example. The IDC interference coordination apparatus is applied to an LTE base station in an EN-DC scenario. As shown in FIG. 7, the apparatus for coordinating IDC interference includes:

a first receiving module 71 configured to receive an IDC interference report reported by user equipment, where the IDC interference report carries IDC interference information of the user equipment in the EN-DC scenario, and the IDC interference information includes an interference parameter indicating IDC interference;

a first determining module 72 configured to determine information for coordinating IDC interference based on the IDC interference report; and a first sending module 73 configured to send the information for coordinating IDC interference to the user equipment.

Figure 8:
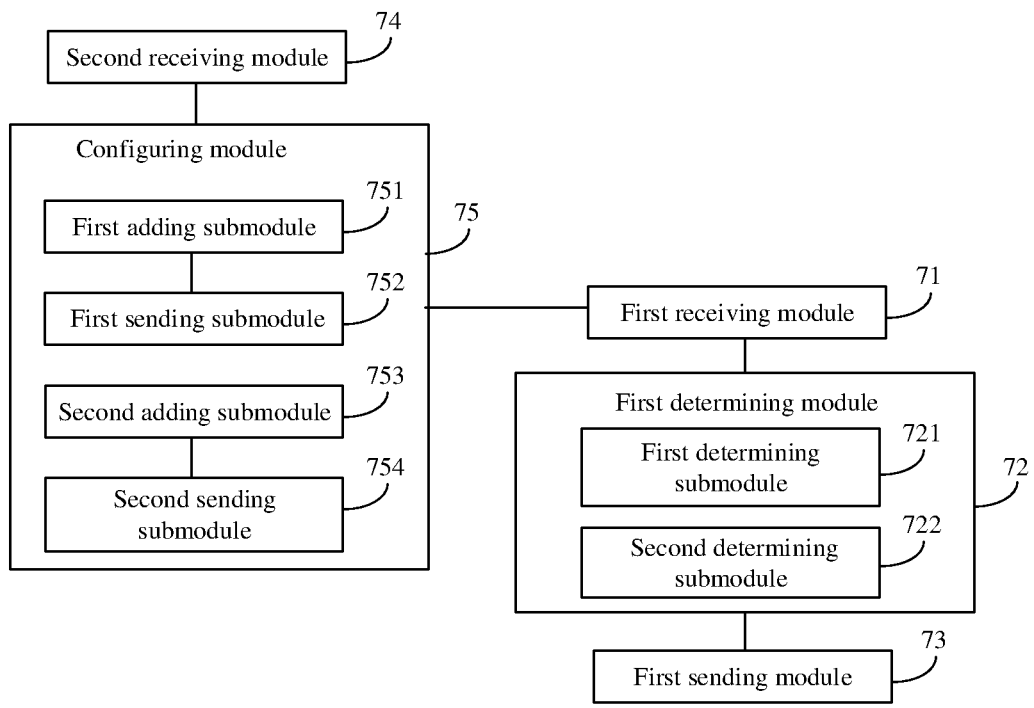
FIG. 8 is a block diagram illustrating another apparatus for coordinating IDC interference according to an example.

FIG. 8 is a block diagram illustrating another apparatus for coordinating IDC interference according to an example. As shown in FIG. 8, on the basis of the example shown in FIG. 7, in an example, the apparatus further includes:

a second receiving module 74 configured to receive information of IDC interference coordination capability reported by the user equipment through first RRC signaling, where the information of IDC interference coordination capability indicates whether the user equipment is capable of supporting IDC interference coordination in the EN-DC scenario; and a configuring module 75 configured to configured to receive information of IDC interference coordination capability reported by the user equipment through first RRC signaling, where the information of IDC interference coordination capability indicates whether the user equipment is capable of supporting IDC interference coordination in the EN-DC scenario; and includes capability of the user equipment to report the IDC interference report, or capability of the user equipment to report the IDC interference report and capability of the user equipment to deny autonomously, where the capability to deny autonomously indicates a number of uplink transmission units that the user equipment is allowed to autonomously deny within a set time period.

In an example, the IDC interference information of the user equipment in the EN-DC scenario includes at least one of the following information: an interfered frequency band, an interfered cell, an interfered system type or an interference direction; and the IDC interference report further includes recommended coordination information for coordinating IDC interference.

In an example, the first determining module 72 includes:

a first determining submodule 721 configured to, in response to that the IDC interference report includes recommended coordination information for coordinating IDC interference, determine the information for coordinating IDC interference based on the recommended coordination information for coordinating IDC interference; and a second determining submodule 722 configured to, in response to that the IDC interference report does not comprise the recommended coordination information for coordinating IDC interference, determine the information for coordinating IDC interference based on the IDC interference information.

In an example, the configuring module 75 includes:

a first adding submodule 751 configured to obtain the second RRC signaling by adding a first information element to original RRC connection reconfiguration signaling and adding a first indicating bit to the first information element, where the first indicating bit indicates the capability of the user equipment to process IDC interference occurring in the EN-DC scenario; and a first sending submodule 752 configured to send the second RRC signaling to the user equipment.

In an example, the configuring module 75 includes:

a second adding submodule 753 configured to obtain the second RRC signaling by adding a second indicating bit to original IDC configuration signaling, where the second indicating bit indicates the capability of the user equipment to process IDC interference occurring in the EN-DC scenario; and a second sending submodule 754 configured to send the second RRC signaling to the user equipment.

Figure 9:
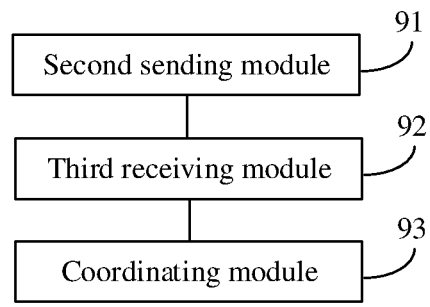
FIG. 9 is a block diagram illustrating an apparatus for coordinating IDC interference according to an example.

FIG. 9 is a block diagram illustrating an apparatus for coordinating IDC interference according to an example. The apparatus for coordinating IDC interference is applied to user equipment supporting an EN-DC scenario. As shown in FIG. 9, the apparatus for coordinating IDC interference includes:

a second sending module 91 configured to, in response to that IDC interference occurs in a system including an LTE system and/or an NR system, send an IDC interference report to an LTE base station, where the IDC interference report carries IDC interference information of the user equipment in the EN-DC scenario, and the IDC interference information includes an interference parameter indicating the IDC interference;

a third receiving module 92 configured to receive information for coordinating IDC interference sent by the LTE base station in response to the IDC interference report; and a coordinating module 93 configured to perform IDC interference coordination processing based on the information for coordinating IDC interference.

Figure 10:
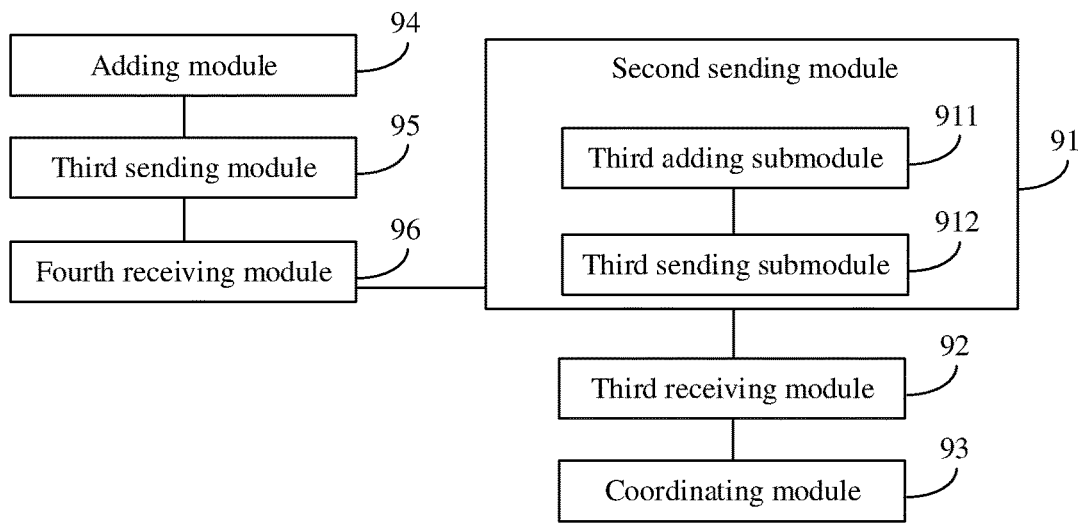
FIG. 10 is a block diagram illustrating another apparatus for coordinating IDC interference according to an example.

FIG. 10 is a block diagram illustrating another apparatus for coordinating IDC interference according to an example. As shown in FIG. 10, on the basis of the example shown in FIG. 9, in an example, the second sending module 91 includes:

a third adding submodule 911 configured to obtain third RRC signaling by adding a second information element to original IDC indication signaling, where the second information element includes the IDC interference report; and a third sending submodule 912 configured to send the third RRC signaling to the LTE base station.

In an example, the apparatus further includes:

an adding module 94 configured to obtain first RRC signaling by adding a third information element to original network capability signaling supported by the user equipment and adding a third indicating bit to the third information element, where the third indicating bit indicates whether the user equipment is capable of supporting IDC interference coordination in the EN-DC scenario;

a third sending module 95 configured to send the first RRC signaling to the LTE base station; and a fourth receiving module 96 configured to receive second RRC signaling sent by the LTE base station in response to the first RRC signaling, where the second RRC signaling is to configure, for the user equipment, capability of the user equipment to process IDC interference occurring in the EN-DC scenario, and the capability to process IDC interference includes capability of the user equipment to report the IDC interference report, or capability of the user equipment to report the IDC interference report and capability of the user equipment to deny autonomously, where the capability to deny autonomously indicates a number of uplink transmission units that the user equipment is allowed to autonomously deny within a set time period.

In an example, the coordinating module 93 is further configured to:

in response to that the capability to process IDC interference indicates that the user equipment is currently capable of performing autonomous denial and an interference direction satisfies a condition, for the IDC interference occurring in the system including the LTE system and/or the NR system, perform the IDC interference coordination processing in the autonomous denial.

With regard to the apparatus in the above examples, the specific manner in which each module performs operation has been described in detail in the examples of the method, and will not be elaborated here.

Figure 11:
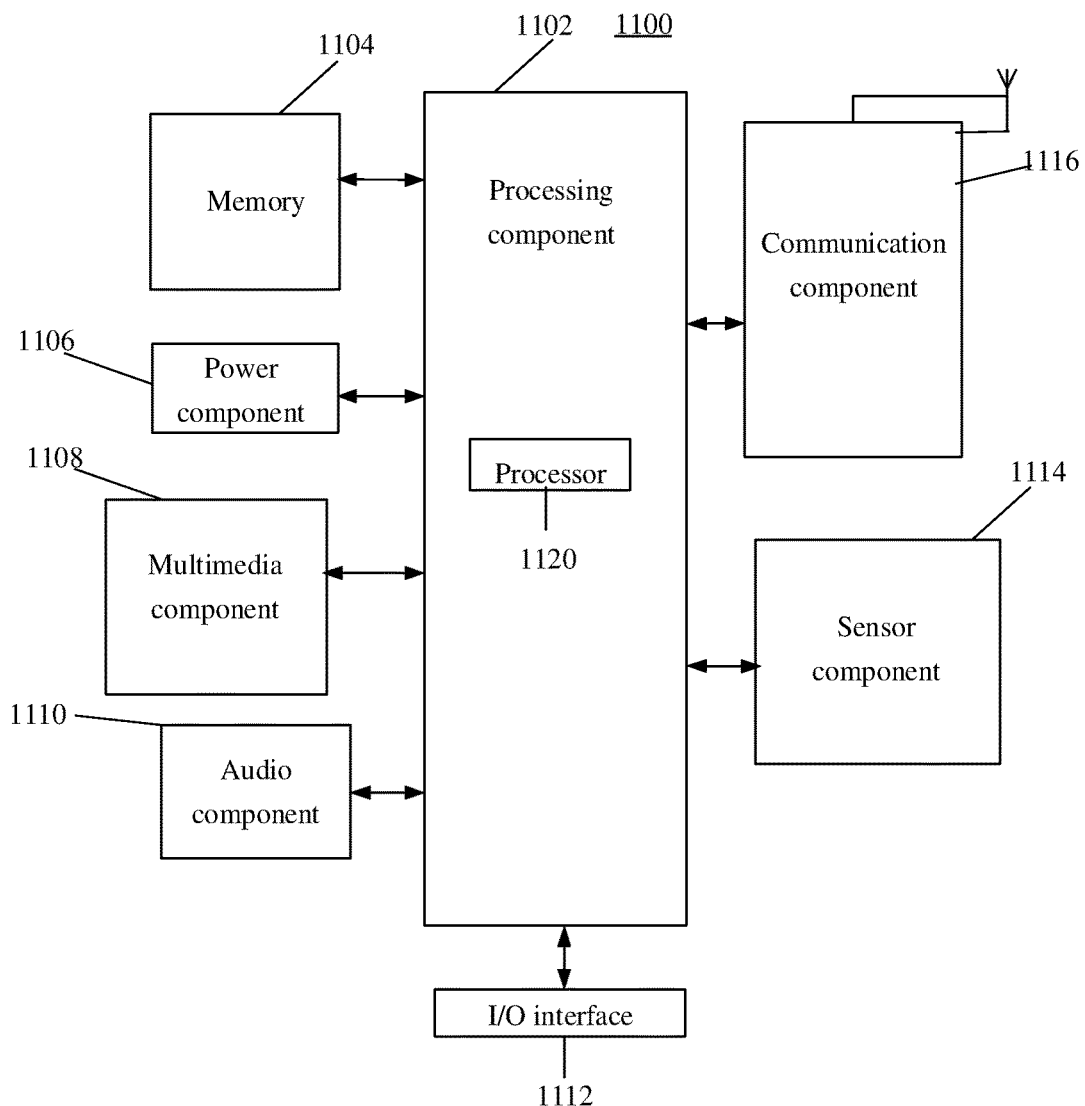
FIG. 11 is a block diagram illustrating an apparatus suitable for coordinating IDC interference according to an example.

FIG. 11 is a block diagram illustrating an apparatus suitable for IDC interference coordination according to an example. For example, an apparatus 1100 may be a mobile phone, a computer, a digital broadcast terminal, a messaging device, a game console, a tablet device, a medical equipment, a fitness equipment, a personal digital assistant or other user equipment.

Referring to FIG. 11, the apparatus 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 usually controls the overall operation of the apparatus 1100, such as operations associated with display, telephone calls, data communications, camera operations, and recording operations. The processing component 1102 may include one or more processors 1120 to execute instructions to perform all or part of the steps in the methods described above. Moreover, the processing component 1102 may include one or more modules to facilitate interaction between the processing component 1102 and other components. For example, the processing component 1102 may include a multimedia module to facilitate interaction between the multimedia component 1108 and the processing component 1102.

The memory 1104 is configured to store various types of data to support operation at the apparatus 1100. Examples of these data include instructions for any application or method operating at the apparatus 1100, contact data, phone book data, messages, pictures, videos, and the like. The memory 1104 may be implemented by any type of volatile or non-volatile storage device or a combination thereof, such as a static random access memory (SRAM), an electrically erasable programmable read only memory (EEPROM), an erasable programmable read only memory (EPROM), a programmable read only memory (PROM), a read only memory (ROM), a magnetic memory, a flash memory, a disk or an optical disk.

The power component 1106 provides power to various components of the apparatus 1100. The power component 1106 may include a power management system, one or more power sources, and other components associated with power generated, managed, and distributed for the apparatus 1100.

The multimedia component 1108 includes a screen that provides an output interface between the apparatus 1100 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 1108 includes a front camera and/or a rear camera. When the apparatus 1100 is in an operation mode, such as a shooting mode or a video mode, the front camera and/or the rear camera may receive external multimedia data. Each of the front and rear cameras may be a fixed optical lens system or have a focal length and an optical zoom capability.

The audio component 1110 is configured to output and/or input audio signals. For example, the audio component 1110 includes a microphone (MIC) configured to receive an external audio signal when the apparatus 1100 is in an operation mode, such as a call mode, a recording mode, and a voice recognition mode. The received audio signal may be further stored in the memory 1104 or transmitted via the communication component 1116. In some examples, the audio component 1110 also includes a loudspeaker for outputting an audio signal.

The I/O interface 1112 provides an interface between the processing component 1102 and a peripheral interface module which may be a keyboard, a click wheel, a button, or the like. These buttons may include, but are not limited to a home button, a volume button, a start button, and a lock button.

The sensor component 1114 includes one or more sensors for providing a status assessment in various aspects to the apparatus 1100. For example, the sensor component 1114 may detect an open/closed state of the apparatus 1100, and the relative positioning of components, for example, the component is a display and a keypad of the apparatus 1100. The sensor component 1114 may also detect a change in position of the apparatus 1100 or a component of the apparatus 1100, the presence or absence of a user in contact with the apparatus 1100, the orientation or acceleration/deceleration of the apparatus 1100 and a change in temperature of the apparatus 1100. The sensor component 1114 may include a proximity sensor configured to detect the presence of nearby objects without any physical contact. The sensor component 1114 may also include a light sensor, such as a CMOS or CCD image sensor, for use in imaging applications. In some examples, the sensor component 1114 may also include an acceleration sensor, a gyro sensor, a magnetic sensor, a pressure sensor, or a temperature sensor.

The communication component 1116 is configured to facilitate wired or wireless communication between the apparatus 1100 and other devices. The apparatus 1100 may access a wireless network based on a communication standard, such as WiFi, 2G or 3G, or a combination thereof. In an example, the communication component 1116 receives broadcast signals or broadcast associated information from an external broadcast management system via a broadcast channel In an example, the communication component 1116 also includes a near field communication (NFC) module to facilitate short range communication. For example, the NFC module may be implemented based on a radio frequency identification (RFID) technology, an infrared data association (IrDA) technology, an ultra wide band (UWB) technology, a Bluetooth (BT) technology, and other technologies.

In an example, the apparatus 1100 may be implemented by one or more application specific integrated circuits (ASICs), digital signal processors (DSPs), digital signal processing devices (DSPDs), programmable logic devices (PLDs), a field programmable gate array (FPGA), a controller, a microcontroller, a microprocessor or other electronic elements for performing the above methods.

In an example, there is also provided a non-transitory computer readable storage medium including instructions, such as the memory 1104 including instructions, where the instructions are executable by the processor 1120 of the apparatus 1100 to perform the method according to the second aspect: in response to that IDC interference occurs in a system including an LTE system and/or an NR system, sending an IDC interference report to an LTE base station, where the IDC interference report carries IDC interference information of the user equipment in the EN-DC scenario; receiving information for coordinating IDC interference sent by the LTE base station in response to the IDC interference report; and performing IDC interference coordination processing based on the information for coordinating IDC interference.

In an example, the non-transitory computer readable storage medium may be a ROM, a random access memory (RAM), a CD-ROM, a magnetic tape, a floppy disk, and an optical data storage device.

Figure 12:
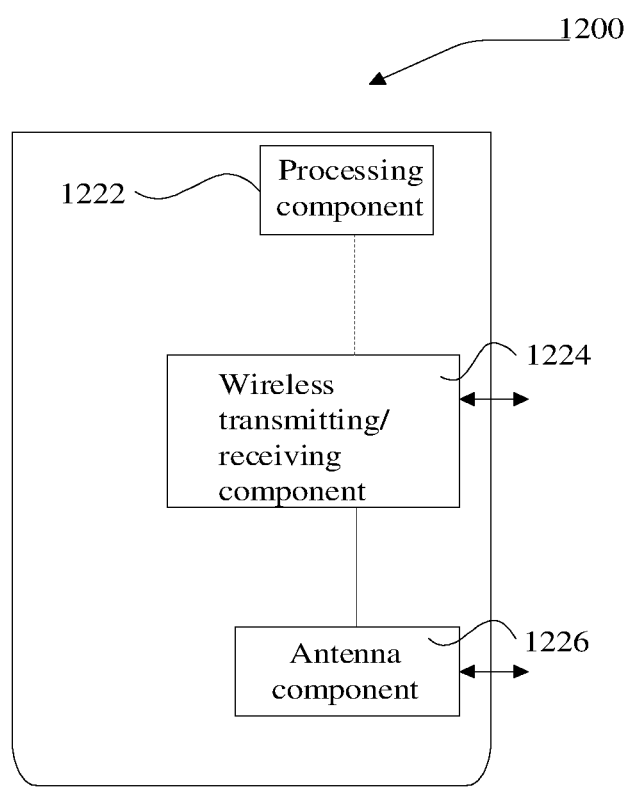
FIG. 12 is a block diagram illustrating an apparatus suitable for coordinating IDC interference according to an example.

FIG. 12 is a block diagram illustrating an apparatus suitable for data transmission according to an example. An apparatus 1200 may be provided to a communication device such as an LTE base station. Referring to FIG. 12, the apparatus 1200 includes a processing component 1222, a wireless transmitting/receiving component 1224, an antenna component 1226, and a signal processing portion specific to a wireless interface. The processing component 1222 may further include one or more processors.

One of the processors in the processing component 1222 may be configured to perform the method of coordinating the IDC interference according to the first aspect.

In an example, there is also provided a non-transitory computer readable storage medium including instructions, where the instructions can be executable by the processing component 1222 of the apparatus 1200 to perform the method according to the first aspect: receiving an IDC interference report reported by user equipment, where the IDC interference report carries IDC interference information of the user equipment in the EN-DC scenario; determining information for coordinating IDC interference based on the IDC interference report; and sending the information for coordinating IDC interference to the user equipment.

In an example, the non-transitory computer readable storage medium may be a ROM, a random access memory (RAM), a CD-ROM, a magnetic tape, a floppy disk, and an optical data storage device.

Other embodiments of the present disclosure will be readily apparent to those skilled in the art after considering the specification and practicing the contents disclosed herein. The present application is intended to cover any variations, uses, or adaptations of the present disclosure, which follow the general principle of the present disclosure and include common knowledge or conventional technical means in the art that are not disclosed in the present disclosure. The specification and examples are to be regarded as illustrative only. The true scope and spirit of the present disclosure are pointed out by the following claims.

It is to be understood that the present disclosure is not limited to the precise structures that have described and shown in the drawings, and various modifications and changes can be made without departing from the scope thereof. The scope of the disclosure is to be limited only by the appended claims.

The invention claimed is:

1. A method of coordinating In-Device Coexistence (IDC) interference, being applied to a Long Term Evolution (LTE) base station in an Evolved universal terrestrial radio access network—New radio Dual Connectivity (EN-DC) scenario, the EN-DC scenario comprising the LTE base station as a master base station and a New Radio (NR) base station as a secondary base station, and the method comprising:

receiving an IDC interference report reported by user equipment, wherein the IDC interference report carries IDC interference information of the user equipment in the EN-DC scenario, the IDC interference information comprises an interference parameter indicating IDC interference, and the IDC interference report is sent in response to the IDC interference occurring between an NR system of the user equipment and another system of the user equipment;

determining information for coordinating the IDC interference based on the IDC interference report; and sending the information for coordinating the IDC interference to the user equipment.

2. The method according to claim 1, further comprising:
receiving information of IDC interference coordination capability reported by the user equipment through first Radio Resource Control (RRC) signaling, wherein the information of IDC interference coordination capability indicates whether the user equipment is capable of supporting IDC interference coordination in the EN-DC scenario; and
configuring, based on the information of IDC interference coordination capability and for the user equipment, capability of the user equipment to process IDC interference occurring in the EN-DC scenario by using second RRC signaling, wherein the capability to process IDC interference comprises:
capability of the user equipment to report the IDC interference report, or
capability of the user equipment to report the IDC interference report and capability of the user equipment to deny autonomously, wherein the capability to deny autonomously indicates a number of uplink transmission units that the user equipment is allowed to autonomously deny within a set time period.

3. The method according to claim 2, wherein configuring, for the user equipment, the capability of the user equipment to process IDC interference occurring in the EN-DC scenario by using the second RRC signaling comprises:
obtaining the second RRC signaling by adding a first information element to original RRC connection reconfiguration signaling and adding a first indicating bit to the first information element, wherein the first indicating bit indicates the capability of the user equipment to process IDC interference occurring in the EN-DC scenario; and
sending the second RRC signaling to the user equipment.

4. The method according to claim 2, wherein configuring, for the user equipment, the capability of the user equipment to process IDC interference occurring in the EN-DC scenario by using the second RRC signaling comprises:
obtaining the second RRC signaling by adding a second indicating bit to original IDC configuration signaling, wherein the second indicating bit indicates the capability of the user equipment to process IDC interference occurring in the EN-DC scenario; and
sending the second RRC signaling to the user equipment.

5. The method according to claim 1, wherein
the IDC interference information of the user equipment in the EN-DC scenario comprises at least one of the following information: an interfered frequency band, an interfered cell, an interfered system type or an interference direction; and
the IDC interference report further comprises recommended coordination information for coordinating IDC interference.

6. The method according to claim 1, wherein determining the information for coordinating IDC interference based on the IDC interference report comprises:
in response to that the IDC interference report comprises recommended coordination information for coordinating IDC interference, determining the information for coordinating IDC interference based on the recommended coordination information for coordinating IDC interference; and
in response to that the IDC interference report does not comprise the recommended coordination information for coordinating IDC interference, determining the information for coordinating IDC interference based on the IDC interference information.

7. A method of coordinating In-Device Coexistence (IDC) interference, being applied to user equipment in an Evolved universal terrestrial radio access network—New radio Dual Connectivity (EN-DC) scenario, the EN-DC scenario comprising a Long Term Evolution (LTE) base station as a master base station and a New Radio (NR) base station as a secondary base station, and the method comprising:
in response to that IDC interference occurs between an NR system of the user equipment and another system of the user equipment, sending an IDC interference report to the LTE base station, wherein the IDC interference report carries IDC interference information of the user equipment in the EN-DC scenario, and the IDC interference information comprises an interference parameter indicating the IDC interference;
receiving information for coordinating the IDC interference sent by the LTE base station in response to the IDC interference report; and
performing IDC interference coordination processing based on the information for coordinating the IDC interference.

8. The method according to claim 7, wherein sending the IDC interference report to the LTE base station comprises:
obtaining third RRC signaling by adding a second information element to original IDC indication signaling, wherein the second information element comprises the IDC interference report; and
sending the third RRC signaling to the LTE base station.

9. The method according to claim 7, further comprising:
obtaining first RRC signaling by adding a third information element to original network capability signaling supported by the user equipment and adding a third indicating bit to the third information element, wherein the third indicating bit indicates whether the user equipment is capable of supporting IDC interference coordination in the EN-DC scenario;
sending the first RRC signaling to the LTE base station; and
receiving second RRC signaling sent by the LTE base station in response to the first RRC signaling, wherein the second RRC signaling is to configure, for the user equipment, capability of the user equipment to process IDC interference occurring in the EN-DC scenario, and the capability to process IDC comprises:
capability of the user equipment to report the IDC interference report, or
capability of the user equipment to report the IDC interference report and capability of the user equipment to deny autonomously, wherein the capability to deny autonomously indicates a number of uplink transmission units that the user equipment is allowed to autonomously deny within a set time period.

10. The method according to claim 9, further comprising:
in response to that the capability to process IDC interference indicates that the user equipment is currently capable of performing autonomous denial and an interference direction satisfies a condition, for the IDC interference occurring between the NR system and the another system, performing the IDC interference coordination processing in the autonomous denial.

11. A Long Term Evolution (LTE) base station in an Evolved universal terrestrial radio access network—New radio Dual Connectivity (EN-DC) scenario, the EN-DC scenario comprising the LTE base station as a master base station and a New Radio (NR) base station as a secondary base station, the LTE base station comprising:
a processor; and
a memory for storing instructions executable by the processor,
wherein the processor is configured to:
receive an In-Device Coexistence (IDC) interference report reported by user equipment, wherein the IDC interference report carries IDC interference information of the user equipment in the EN-DC scenario, the IDC interference information comprises an interference parameter indicating IDC interference, and the IDC interference report is sent in response to the IDC interference occurring between an NR system of the user equipment and another system of the user equipment;
determine information for coordinating the IDC interference based on the IDC interference report; and
send the information for coordinating the IDC interference to the user equipment.

12. The LTE base station according to claim 11, wherein the processor is further configured to:
receive information of IDC interference coordination capability reported by the user equipment through first Radio Resource Control (RRC) signaling, wherein the information of IDC interference coordination capability indicates whether the user equipment is capable of supporting IDC interference coordination in the EN-DC scenario; and
configure, based on the information of IDC interference coordination capability and for the user equipment, capability of the user equipment to process IDC interference occurring in the EN-DC scenario by using second RRC signaling, wherein the capability to process IDC interference comprises:
capability of the user equipment to report the IDC interference report, or
capability of the user equipment to report the IDC interference report and capability of the user equipment to deny autonomously, wherein the capability to deny autonomously indicates a number of uplink transmission units that the user equipment is allowed to autonomously deny within a set time period.

13. The LTE base station according to claim 12, wherein in configuring, for the user equipment, the capability of the user equipment to process IDC interference occurring in the EN-DC scenario by using the second RRC signaling, the processor is further configured to:
obtain the second RRC signaling by adding a first information element to original RRC connection reconfiguration signaling and adding a first indicating bit to the first information element, wherein the first indicating bit indicates the capability of the user equipment to process IDC interference occurring in the EN-DC scenario; and
send the second RRC signaling to the user equipment.

14. The LTE base station according to claim 12, wherein in configuring, for the user equipment, the capability of the user equipment to process IDC interference occurring in the EN-DC scenario by using the second RRC signaling, the processor is further configured to:
obtain the second RRC signaling by adding a second indicating bit to original IDC configuration signaling, wherein the second indicating bit indicates the capability of the user equipment to process IDC interference occurring in the EN-DC scenario; and
send the second RRC signaling to the user equipment.

15. The LTE base station according to claim 11, wherein:
the IDC interference information of the user equipment in the EN-DC scenario comprises at least one of the following information: an interfered frequency band, an interfered cell, an interfered system type or an interference direction; and
the IDC interference report further comprises recommended coordination information for coordinating IDC interference.

16. The LTE base station according to claim 11, wherein in determining the information for coordinating IDC interference based on the IDC interference report, the processor is further configured to:
in response to that the IDC interference report comprises recommended coordination information for coordinating IDC interference, determine the information for coordinating IDC interference based on the recommended coordination information for coordinating IDC interference; and
in response to that the IDC interference report does not comprise the recommended coordination information for coordinating IDC interference, determine the information for coordinating IDC interference based on the IDC interference information.

17. User equipment in an Evolved universal terrestrial radio access network—New radio Dual Connectivity (EN-DC) scenario, the EN-DC scenario comprising a Long Term Evolution (LTE) base station as a master base station and a New Radio (NR) base station as a secondary base station, and the user equipment comprising:
a processor; and
a memory for storing instructions executable by the processor,
wherein the processor is configured to:
in response to that In-Device Coexistence (IDC) interference occurs between an NR system of the user equipment and another system of the user equipment, send an IDC interference report to the LTE base station, wherein the IDC interference report carries IDC interference information of the user equipment, and the IDC interference information comprises an interference parameter indicating the IDC interference;
receive information for coordinating the IDC interference sent by the LTE base station in response to the IDC interference report; and
perform IDC interference coordination processing based on the information for coordinating the IDC interference.

18. The user equipment according to claim 17, wherein in sending the IDC interference report to the LTE base station, the processor is further configured to:
obtain third RRC signaling by adding a second information element to original IDC indication signaling, wherein the second information element comprises the IDC interference report; and
send the third RRC signaling to the LTE base station.

19. The user equipment according to claim 17, wherein the processor is further configured to:
obtain first RRC signaling by adding a third information element to original network capability signaling supported by the user equipment and adding a third indicating bit to the third information element, wherein the third indicating bit indicates whether the user equipment is capable of supporting IDC interference coordination in the EN-DC scenario;
send the first RRC signaling to the LTE base station; and receive second RRC signaling sent by the LTE base station in response to the first RRC signaling, wherein the second RRC signaling is to configure, for the user equipment, capability of the user equipment to process IDC interference occurring in the EN-DC scenario, and the capability to process IDC comprises:

capability of the user equipment to report the IDC interference report, or capability of the user equipment to report the IDC interference report and capability of the user equipment to deny autonomously, wherein the capability to deny autonomously indicates a number of uplink transmission units that the user equipment is allowed to autonomously deny within a set time period.

20. The user equipment according to claim 19, wherein the processor is further configured to:

in response to that the capability to process IDC interference indicates that the user equipment is currently capable of performing autonomous denial and an interference direction satisfies a condition, for the IDC interference occurring between the NR system and the another system, perform the IDC interference coordination processing in the autonomous denial.

* * * * *